United States Patent [19]

Lunder et al.

[11] 4,410,556

[45] Oct. 18, 1983

[54] POWDERED TEA EXTRACT

[75] Inventors: Tito-Livio Lunder; Corine-Madeleine Nielsen, both of Lausanne, Switzerland

[73] Assignee: Societe d'Assistance Technique Pour Produits Nestle S.A., Lausanne, Switzerland

[21] Appl. No.: 310,743

[22] Filed: Oct. 13, 1981

Related U.S. Application Data

[63] Continuation-in-part of Ser. No. 272,669, Jun. 11, 1981, abandoned.

[51] Int. Cl.³ ............................................... A23F 3/16
[52] U.S. Cl. .................................... 426/597; 426/435
[58] Field of Search ................................ 426/435, 597

[56] References Cited

U.S. PATENT DOCUMENTS 2,785,979  3/1957  Mitchell .............................. 426/597
4,130,669  12/1978  Gregg ............................ 426/597 X

FOREIGN PATENT DOCUMENTS 53-69894  6/1978  Japan ................................. 426/435
446369  4/1936  United Kingdom ................ 426/597
1207326  9/1970  United Kingdom ................ 426/597

OTHER PUBLICATIONS

Pintauro, Tea and Soluble Tea Products Manufacture, 1977, Fd. Tech. Rev. No. 38, Noyes Data Corp.: Park Ridge, N.J., pp. 46-48, 74-76, 79-80.
Lust, The Herb Book, 1974, Bantam Books: New York, pp. 520-526.

Primary Examiner—Joseph M. Golian
Attorney, Agent, or Firm—Vogt & O'Donnell

[57] ABSTRACT

A process for preparing a powdered tea extract which comprises extracting tea leaves firstly at ambient temperature and then at an elevated temperature, with an aqueous medium which contains, at least during the extraction at ambient temperature, a food-acceptable carboxylic acid or a corresponding food-acceptable salt or any mixture thereof and afterwards drying the aqueous extract obtained.

12 Claims, No Drawings

POWDERED TEA EXTRACT

This is a continuation-in-part of application Ser. No. 272,669, filed June 11, 1981, now abondoned.

The present invention relates to an improved process for the preparation of a soluble tea extract and more particularly to a powdered tea extract which is readily and completely soluble in cold water.

During the production of powdered tea extracts, certain substances are extracted from the tea leaves which are insoluble in cold water and result in a cloudy formation when the extract is added to cold water. Although these substances may be removed by cooling the hot aqueous tea extract to precipitate them, there is a loss of up to about 10% of the total tea solids if the precipitated portion is then discarded, thus leading to a substantial loss of normal tea flavouring components. On the other hand, powdered tea extracts which have been solubilised by a chemical treatment give a reconstituted beverage which is very foamy and has exceedingly poor stability, palatability and drinking qualities.

We have surprisingly found that by extracting tea leaves, firstly at ambient temperature and then at an elevated temperature, with an aqueous medium which contains, at least during the extraction at ambient temperature, a carboxylic acid or a corresponding salt or any mixture thereof and afterwards drying the extract, a powdered tea product instantly and completely soluble in cold water may be obtained. In this invention, it is to be understood that the carboxylic acids and their corresponding salts are food-acceptable.

Accordingly, the present invention provides a process for preparing a powdered tea extract characterised in that tea leaves are extracted, firstly at ambient temperature and then at an elevated temperature, with an aqueous medium which contains, at least during the extraction at ambient temperature, a carboxylic acid or a corresponding salt or any mixture thereof and the aqueous extract obtained is afterwards dried.

This invention is applicable to all kinds of black teas and their blends, caffeine bearing tea-like leaves such as the varieties of Mate and their blends, as well as herbal teas. In this invention the word "tea" is intended to cover all the aforementioned plant materials. When the aqueous medium contains a carboxylic acid, this invention is particularly applicable to those teas where lemon flavouring is foreseen, for example, lemon tea formulations and especially those herbal teas which are commonly drunk with the addition of lemon juice.

If the aqueous medium contains a carboxylic acid, the latter is advantageously aliphatic and may be an aliphatic di- or tri-carboxylic acid, for example malic acid or succinic acid, but preferably citric acid or tartaric acid. An aqueous medium containing citric acid or tartaric acid is especially suitable for the production of cold-soluble lemon teas by the process of this invention. If desired, the aqueous medium may contain lemon juice which may, if desired, be used in an appropriate amount instead of citric acid. The amount of carboxylic acid present in the aqueous medium may conveniently be from 1% to 25% by weight and preferably from 5% to 15% by weight based on the weight of the tea leaves to be extracted. While the pH of the aqueous medium containing the carboxylic acid is not critical, it is generally in the range of from 2.0 to 3.5, and conveniently from 2.5 to 3.

If the aqueous medium contains a salt of a carboxylic acid, the salt is preferably an alkali metal or an alkaline earth metal salt, for example sodium citrate or calcium citrate. If the salt is present in the aqueous medium in addition to the carboxylic acid, the amount of salt present may conveniently be from 1% to 25% by weight and preferably from 5% to 15% by weight based on the weight of the tea leaves to be extracted. If the salt is present in the aqueous medium in the absence of a carboxylic acid the amount of salt present may conveniently be from 0.25% to 10% by weight preferably from 0.5% to 7.5% by weight and especially from 1% to 5% by weight based on the weight of the tea leaves to be extracted.

If desired the aqueous medium may contain ascorbic acid, for example, in an amount up to 2% by weight and preferably from 0.5% to 1.5% by weight based on the weight of tea leaves to be extracted. The presence of ascorbic acid is particularly advantageous when the aqueous medium does not contain a carboxylic acid.

The amount of tea leaves contacted with the aqueous medium is conveniently from 1% to 10% by weight and preferably from 2.5% to 7.5% by weight based on the weight of the aqueous medium.

By "ambient temperature" in this invention we mean any temperature normally encountered in the surrounding environment, for instance from 10° C. to 40° C. preferably from 15° C. to 30° C. and especially from 20° C. to 25° C.

The period of time for contacting the tea leaves with the aqueous medium at ambient temperature may vary from 1 minute to 2 hours, preferably from 5 minutes to 1 hour and especially from 10 to 45 minutes. Although a period of contact greater than 2 hours is possible, it is generally unnecessary.

After the contact of the tea leaves with the aqueous medium at ambient temperature, the extraction at the elevated temperature may be carried out at a temperature of at least 60° C., preferably at least 80° C. and especially from 90° C. to 100° C. Advantageously, this extraction is carried out for a period of from 1 to 10 minutes and preferably from 2.5 to 7.5 minutes. Although a period of time longer than 10 minutes is possible, it is usually unnecessary.

If the tea leaves are extracted both at ambient temperature and at elevated temperature with the aqueous medium containing a carboxylic acid or a corresponding salt or any mixture thereof, the powdered extract is conveniently obtained by separating the aqueous extract from the tea leaves after the extraction at the elevated temperature and then drying it. This may be done batchwise or countercurrently. In a batchwise process the tea leaves may be contacted at ambient temperature with the aqueous medium in a suitable vessel, preferably with agitation such as stirring, for a period of time sufficient to ensure good contact of the tea leaves with the aqueous medium, the mixture is then heated, again preferably with agitation such as stirring and the aqueous extract is afterwards separated from the tea leaves, conveniently by filtration, before being dried. In a countercurrent process the aqueous medium at ambient temperature conveniently flows through a plurality of cells containing tea leaves and then at the elevated temperature through a plurality of cells containing tea leaves which have previously been contacted with the aqueous medium at ambient temperature, the extract being drawn off from the cell containing the least exhausted tea leaves and then dried.

If the tea leaves are extracted only at ambient temperature with the aqueous medium containing a carboxylic acid or a corresponding salt or any mixture thereof, the aqueous extract obtained by the extraction at ambient temperature is separated from the tea leaves before they are extracted at an elevated temperature with another food-acceptable aqueous medium which may conveniently be hot water. The aqueous extract obtained by extraction at the elevated temperature is separated from the tea leaves and the powdered extract may conveniently be obtained by combining the two extracts obtained by the extractions at ambient and elevated temperatures respectively and drying the mixed extract. This embodiment may also be carried out batchwise or countercurrently. In a batchwise process, the tea leaves may be contacted at ambient temperature with the aqueous medium in a suitable vessel, preferably with agitation such as stirring, for a period of time sufficient to ensure good contact of the tea leaves with the aqueous medium, this first aqueous extract is separated from the tea leaves, preferably by filtration, and the filtered tea leaves are contacted at the elevated temperature with another aqueous medium, for example hot water, again preferably with agitation such as stirring, and this second aqueous extract is separated from the tea leaves, preferably, by filtration, after which the powdered extract may conveniently be obtained by combining the two extracts and drying the mixed extract. In a countercurrent process the aqueous medium at ambient temperature conveniently flows through a plurality of cells containing tea leaves and the aqueous extract is drawn off from the cell containing the least exhausted tea leaves and then another aqueous medium, for example, hot water flows at elevated temperature through a plurality of cells containing tea leaves which have previously been extracted at ambient temperature, the aqueous extract is drawn off from the cell containing the least exhausted tea leaves after which the powdered extract may conveniently be obtained by combining the two extracts and drying the mixed extract.

If desired the aqueous extracts may be concentrated to a suitable solids content before drying. The powdered extract may be obtained by freeze-drying or spray-drying.

The powdered extract may be mixed with any of the ingredients usually employed in tea preparations, for instance, sucrose, glucose, citric acid, tartaric acid, flavours or anti-caking agents. If desired, volatiles may be removed from the black tea leaves before extraction, for example, by steam distillation and afterwards reincorporated into the powdered extract.

The powdered extract obtained in accordance with the present invention is instantly soluble in cold water and provides beverages having good stability, palatability and drinking qualities.

The following Examples further illustrate the present invention.

EXAMPLE 1

150 g of black tea of good quality were added to 5 liters of tap water in which 20 g of citric acid had previously been dissolved. The mixture was stirred at room temperature for 30 minutes and then it was heated rapidly to 95° C. and maintained at this temperature for 5 minutes. Afterwards the tea leaves were filtered off and the extract was concentrated before being spray-dried to give a light yellow powder which was found to be instantly soluble in cold water.

EXAMPLE 2

By following a similar procedure to that described in Example 1 but using tap water in which 20 g of tartaric acid had previously been dissolved instead of the citric acid dissolved therein, a light yellow powder was obtained which was found to be instantly soluble in cold water.

EXAMPLE 3

By following a similar procedure to that described in Example 1 but using tap water is which 10 g of citric acid and 10 g of sodium citrate had previously been dissolved instead of the citric acid dissolved therein, a light yellow powder was obtained which was found to be instantly soluble in cold water.

EXAMPLE 4

By following a similar procedure to that described in Example 1 but using tap water in which 10 g of tartaric acid and 10 g of sodium citrate had previously been dissolved instead of the citric acid dissolved therein, a light yellow powder was obtained which was found to be instantly soluble in cold water.

EXAMPLE 5

By following a similar procedure to that described in Example 1, but stirring the mixture of tea leaves and acidified water at ambient temperature for 15 minutes instead of for 30 minutes, a light yellow powder was obtained which was found to be instantly soluble in cold water.

EXAMPLE 6

150 g of black tea of good quality were added to 5 liters of tap water in which 4 g of calcium citrate had previously been suspended. The mixture was stirred at room temperature for 45 minutes and then filtered to separate the extract from the tea leaves. Water which has previously been brought to the boiling point was poured on the remaining tea leaves and maintained at the elevated temperature for 5 minutes. Afterwards the mixture was filtered to separate the extract from the tea leaves. This extract was mixed with the extract obtained by the extraction at room temperature and concentrated before being spray-dried to give a light yellow powder which was found to be instantly soluble in cold water.

EXAMPLE 7

150 g of black tea of good quality were added to 5 liters of tap water in which 4 g of sodium citrate had previously been dissolved. The mixture was stirred at room temperature for 45 minutes and then filtered to separate the extract from the tea leaves. Water which had previously been brought to the boiling point was poured on the remaining tea leaves and maintained at the elevated temperature for 5 minutes. Afterwards the mixture was filtered to separate the extract from tea leaves. This extract was mixed with the extract obtained by the extraction at room temperature and concentrated before being spray-dried to give a light yellow powder which was found to be instantly soluble in cold water.

COMPARATIVE EXAMPLE A

By following a similar procedure to that described in Example 1 but using tap water not containing citric acid, a powdered extract was obtained which formed particles in suspension when added to cold water.

COMPARATIVE EXAMPLE B

By following a similar procedure to that described in Example 1 but omitting the extraction at room temperature, a powdered extract was obtained which formed particles in suspension when added to cold water.

We claim:

1. A process for preparing a powdered tea extract which is readily soluble in cold water comprising:
   (a) extracting tea leaves selected from the group consisting of black teas and their blends and caffeine-bearing tea-like leaves and their blends for at least one minute at ambient temperature with an aqueous medium containing, based on the weight of the tea leaves, from 1 to 25% of a food-acceptable aliphatic di- or tri- carboxylic acid or from 0.25 to 10% of a corresponding food-acceptable salt or a mixture thereof containing at least 1% of the acid or at least 0.25% of the salt to obtain a first extract;
   (b) separating the first extract from the extracted tea leaves;
   (c) extracting the extracted tea leaves for at least one minute at a temperature of at least 60° C. with an aqueous medium in the absence of said carboxylic acid or its salts to form a second extract;
   (d) separating the second extract from the twice extracted tea leaves;
   (e) combining the first and second extracts and drying the combined extracts.

2. A process according to claim 1 characterised in that the carboxylic acid contained in the aqueous medium is citric acid or tartaric acid.

3. A process according to claim 1 characterised in that the amount of carboxylic acid present in the aqueous medium is from 5% to 15% by weight based on the weight of tea leaves to be extracted.

4. A process according to claim 1 characterised in that the salt contained in the aqueous medium is sodium citrate or calcium citrate.

5. A process according to claim 1 characterised in that the aqueous medium contains a mixture of a carboxylic acid and a corresponding salt wherein the amount of salt present is from 5 to 15% by weight based on the weight of tea leaves to be extracted.

6. A process according to claim 1 characterised in that the aqueous medium contains a salt in the absence of a carboxylic acid wherein the amount of salt present is from 1% to 5% by weight based on the weight of tea leaves to be extracted.

7. A process according to claim 6 characterised in that the aqueous medium contains up to 2% by weight of ascorbic acid based on the weight of tea leaves to be extracted.

8. A process according to claim 1 characterised in that the amount of tea leaves contacted with the aqueous medium is from 2.5% to 7.5% by weight based on the weight of the aqueous medium.

9. A process according to claim 1 characterised in that the tea leaves are contacted with the aqueous medium at ambient temperature for a period of from 10 to 45 minutes.

10. A process according to claim 1 characterised in that the elevated temperature at which the tea leaves are extracted is from 90° C. to 100° C.

11. A process according to claim 1 characterised in that the tea leaves are extracted at the elevated temperature for a period of from 2.5 to 7.5 minutes.

12. A powdered tea extract whenever prepared by a process according to claim 1.

* * * * *